United States Patent [19]

Knapp

[11] Patent Number: 4,720,188

[45] Date of Patent: * Jan. 19, 1988

[54] PROCESS FOR MANUFACTURING COLORED CONTACT LENSES AND LENSES MADE BY THE PROCESS

[75] Inventor: Julius Z. Knapp, Somerset, N.J.

[73] Assignee: Schering Corporation, Kenilworth, N.J.

[*] Notice: The portion of the term of this patent subsequent to Apr. 15, 2003 has been disclaimed.

[21] Appl. No.: 66,367

[22] Filed: Jun. 25, 1987

Related U.S. Application Data

[63] Continuation of Ser. No. 778,947, Sep. 23, 1985, Pat. No. 4,704,017, which is a continuation-in-part of Ser. No. 600,860, Apr. 16, 1984, Pat. No. 4,582,402, and Ser. No. 628,868, Jul. 9, 1984, abandoned.

[51] Int. Cl.$^4$ ............................ G02C 7/04; D06P 5/00
[52] U.S. Cl. ....................................... 351/177; 8/507; 351/160 H; 351/162
[58] Field of Search ............... 351/160 R, 160 H, 161, 351/162, 177; 8/507

[56] References Cited

U.S. PATENT DOCUMENTS

| | | | |
|---|---|---|---|
| D211,757 | 7/1968 | Urbach | 351/162 X |
| 3,536,386 | 10/1970 | Spivack | 351/162 X |
| 3,679,504 | 7/1972 | Wichterle | 351/162 X |
| 3,712,718 | 1/1973 | LeGrand et al. | 351/162 X |
| 4,460,523 | 7/1984 | Neefe | 351/162 X |
| 4,472,327 | 9/1984 | Neefe | 351/162 X |

Primary Examiner—John K. Corbin
Assistant Examiner—Scott J. Sugarman
Attorney, Agent, or Firm—Warrick E. Lee, Jr.

[57] ABSTRACT

A process for manufacturing colored contact lenses and the lens manufactured by the process. A transparent contact lens having a central pupil section and a surrounding iris section has a colorant applied in a pattern to the entire iris section such that at least about ten percent of surface of the iris section is covered by colorant. The produced lens is capable of coloring the iris of the wearer, yet permits visualization of the structure of the iris. A fundamental color change, e.g. from brown to blue, is possible, yet the colored iris has a natural appearance.

20 Claims, 5 Drawing Figures

PROCESS FOR MANUFACTURING COLORED CONTACT LENSES AND LENSES MADE BY THE PROCESS

This is a continuation of U.S. application Ser. No. 778,947, filed Sept. 23, 1985, now U.S. Pat. No. 4,704,017, which is a continuation-in-part of both U.S. application Ser. No. 600,860, filed Apr. 16, 1984, now U.S. Pat. No. 4,582,402, and U.S. application Ser. No. 628,868, filed July 9, 1984, now abandoned.

BACKGROUND

This invention relates to a process for manufacturing colored contact lenses. More specifically it relates to a process for manufacturing contact lenses which contain a sufficient amount of added colorant to effect a change in the tint or color of the wearers eye while at the same time permitting visualization of the natural anatomy of the iris. The process produces lenses which do not significantly decrease the oxygen permeability of the uncolored contact lens. The invention also relates to colored contact lenses produced by the process.

Colored lenses currently on the market contain a tint throughout the entire section of the lens that covers the iris. While such lenses are capable of enhancing existing eye color or changing the color of light-colored eyes, they are not capable of causing fundamental color changes, for example, from dark brown to light blue.

Wichterle, in U.S. Pat. No. 3,679,504, dated July 25, 1972, discloses a contact lens having an opaque colorant covering the entire iris. While Wichterle's lenses are capable of causing a fundamental color change, the result will be an unnatural appearance unless a pattern in the opaque colorant is very artisticallly drawn or reproduced by expensive photographic means. This is so because the natural appearance of the iris is not a simple solid color, but a structure comprising many shapes and different colors. Moreover, Wichterle's opaque pattern reduces the amount of oxygen transmitted through the lens to the extent that the entire iris section is covered by the opaque colorant.

Urbach, in U.S. Pat. No. Des. 211,757 dated July 23, 1968, discloses a contact lens with a portion of the iris section covered by an ornamental design. Substantial color change cannot be obtained by Urbach because only a portion of the iris is covered by the design.

SUMMARY OF THE INVENTION

The present invention is based on the surprising discovery that a colored contact lens capable of effecting a substantial color change of the eye may be produced by depositing a intermittant pattern of colorant over the entire iris portion of the lens. The colorant should cover at least about 10 percent of the iris portion of the lens surface and may cover a substantially greater portion of the lens surface provided only that a sufficient portion of the iris portion of the lens surface is not colored to permit visualization of the iris, thereby providing a natural appearance. It is possible to actually cause a fundamental color change (e.g., from dark brown to light blue) while still allowing visualization of the structure of the iris.

One aspect of the invention comprises a contact lens having a transparent pupil section, an iris section surrounding such pupil section, and an opaque colorant deposited intermittently over the entire iris section, leaving a substantial portion of the surface of the iris section of the lens uncolored. The size and spacing of the elements of the pattern (e.g. dots) should be such that the pattern is not visible to the naked eye when viewed from a distance of 5 feet by a person having normal 20-20 vision, i.e. the ordinary viewer.

DETAILED DESCRIPTION OF THE INVENTION

Figure 1:
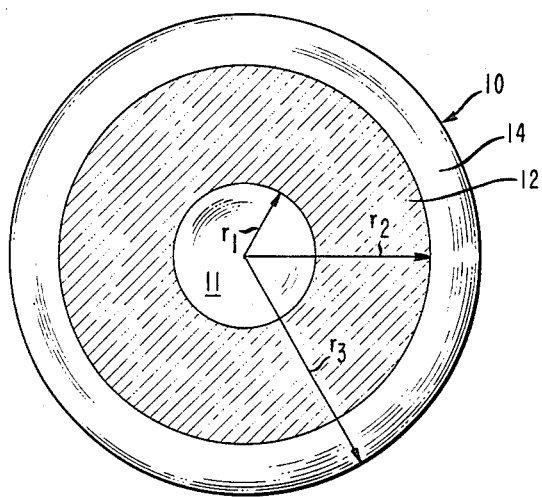
FIG. 1 is a front view of a contact lens in accordance with the invention.

Colored contact lenses in accordance with the invention are shaped like conventional contact lenses, i.e., they have a concave rear surface adapted to be worn against the cornea and a convex front surface. FIG. 1 is a front view of such a lens. Lens 10 has a transparent pupil section 11 and an iris section 12 surrounding the pupil section. These sections cover corresponding parts of the eye of the wearer. Pupil section 11 and iris section 12 may have Radi $r_1$ and $r_2$ of about 2.5 and 4.5 mm. respectively. If the lens is constructed of a hard material, such as polymethyl methacrylate, only the iris and pupil sections are usually present. However, if the lens is made of hydrophilic material, there is usually a transparent peripheral section 14 surrounding the iris section 12 having radius $r_3$, of, for example, about 7.25 mm.

Lenses manufactured in accordance with the present invention allow the structure of the iris to be seen, yet the pattern provides enough covering so that the iris of the wearer's eye appears to be the color of the lenses. To achieve the desired coloring effect, a colorant is deposited intermittantly over the entire iris section, shown shaded in FIG. 1. The interstices of the pattern are left uncolored. The pattern of deposited colorant may be regular or irregular and the shape of the deposits may vary widely provided only that within any reasonably sized portion of the iris section the colorant covers at least about 10 percent, usually at least about 20 percent, and preferably at least about 30 percent of the surface of the iris section while leaving a sufficient portion of the iris section surface uncolored to permit visualization of the natural anatomy of the iris. The colored portion of the iris section may be as much as about 80 percent, but is usually not more than 50 percent and preferably not more than about 40 percent or the iris section surface.

Figure 2:
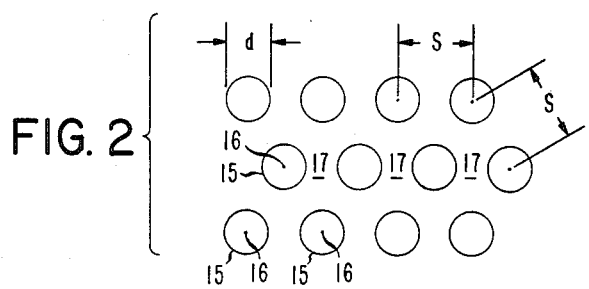
FIG. 2 is an enlarged view of a dot pattern that may be deposited over the iris section of the lens of FIG. 1.

FIG. 2 illustrates a preferred pattern. Dots 15 are arranged so that their centers 16 form equilateral triangles. Each dot has a diameter d of about 0.1 mm. Preferably, the spacings s between the centers of the dots is about 0.13 mm. The dot size and spacing should be such that at least about 10 percent of the surface area of the iris section is covered by the dots, more preferably at least about 30 percent. The uncovered portion 17 of the iris section, i.e., the portion of the iris section within the interstices of the pattern, is left uncolored. The size and spacing of the elements of the pattern (e.g. dots) should be such that the pattern is not visible, i.e., the colored portion looks continuous, when seen by a person looking at the wearer from normal viewing distance The dots may contain varying amounts of pigment and may be opaque or translucent, depending on the degree of pigmentation.

Figure 3:
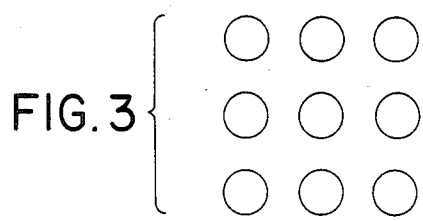
FIGS. 3 and 4 illustrate alternate dot patterns.
Figure 4:
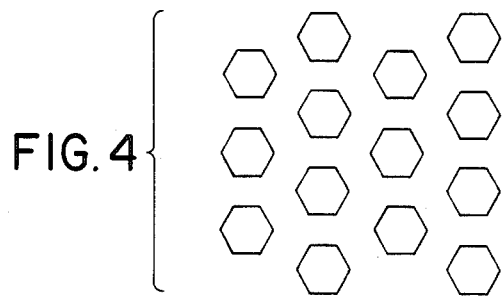
Figure 5:
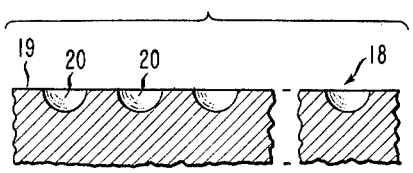
FIG. 5 illustrates a plate that may be used for making lenses in accordance with the invention.

FIGS. 3 and 4 show examples of alternative dot patterns. In FIG. 3 the dots are arranged so that their centers form squares. In FIG. 5 the dots are hexagonally shaped. The shape and arrangement of the dots is not critical, provided that there are enough dots to achieve the desired coloring and enough space between the dots so that the structure of the iris is visible. To provide a more natural look, it has been found advantageous to vary the size, shape, opacity and/or density of the colorant spots over local areas of various size on the iris section of the lens. In particular, it is preferred to decrease the density of coverage near the inner and outer edges of the iris section.

The process of the present invention for making colored contact lenses is as follows. A transparent contact lens comprising at least a pupil section 11 and an iris section 12 surrounding the pupil section is provided.

If the lens is constructed of a hydrophilic material, it also has a peripheral section 14 surrounding iris section 12. For hydrophilic material, the steps described below are performed with the material in an unhydrated state. Preferred h d materials are disclosed by Loshaek in U.S. Pat. No. 4,405,773, incorporated herein by reference.

The colored pattern may be deposited onto iris section 12 of the lens in any manner. The currently preferred method is by offset pad printing, described below in some detail.

A plate 18 as shown in FIG. 5 is prepared having flat surface 19 and circular depressions 20 corresponding to the desired dot pattern. To make the pattern shown in FIG. 2, each depression 20 has a diameter of 0.1 mm. and a depth of 0.013 mm. The depressions are arranged to cover an annular shape corresponding to that of the iris section of the lens.

The plate may be made by a technique that is well known for making integrated analog or digital circuits. First a pattern about 100 times as large as the desired pattern is prepared. Next the pattern is reduced using well known photographic techiques to a pattern of the exact desired size having the portion to be colored darker than the remaining area. Flat surface 19 is covered by a photo resist material which becomes water insoluble when exposed to light. The photo resist material is covered with the pattern and exposed to light. The water soluble (darker) portion of the photo resist pattern is removed by washing with water and the resulting plate is etched to the required depth. Then the remainder of the photo resist material is mechanically removed.

Colorant, comprising a pigment and a binder or carrier for the pigment is deposited on flat surface 19 of the plate and scraped across the pattern with a doctor blade. This causes depressions 20 to be filled with ink while removing excess ink from flat surface 19. The colorant may be more or less opaque depending on the degree of color change desired. The opacity may be varied by modifying the proportion of pigment to binder in the colorant. It will be recognized that a desired affect may be obtained using a highly opaque colorant or by having a somewhat less opaque colorant and covering a greater portion of the iris section surface.

A pad made of silicon rubber, impregnated with silicon oil for easy release, is pressed against the pattern, removing ink from depressions 20. The ink on the pad is allowed to dry slightly to improve tackiness, then pressed against the front surface of the contact lens, depositing the ink in the desired pattern over the iris section. Of course the pad must have enough flexibility to deform to fit over the convex front surface of the lens. For a more natural effect, the printing step may be repeated one or more times using different patterns in different colors, since upon close examination, the iris's of many persons are found to contain more than one color. The printed pattern need not be absolutely uniform, allowing for enhancement of the fine structure of the iris.

Next the deposited pattern is treated to render it resistant to removal from the lens under exposure to the occular fluids that the lens will encounter when placed in the eye. The exact method of preventing removal depends on the material of construction of the lens and the pattern. Mere air drying or heating the lens may suffice. For hydrophilic lenses, the techniques for coating the opaque pattern described in Wichterle, U.S. Pat. No. 3,679,504 (incorporated herein by reference), may be used.

It can be seen that the present invention provides lenses capable of coloring the wearer's iris, while allowing visualization of the fine structure thereof. The invention has several advantages over prior art techniques:

1. A fundamental color change is possible without excessive interference with the oxygen transmissibility of the lens.

2. A natural appearance is achieved despite fundamental color change, because the structure of the iris is visible.

3. Because the pattern leaves a substantial portion of the iris uncoated, a coating over the pattern adheres better.

4. The pattern appears continuous when viewed by an onlooker.

I claim:

1. In a process for manufacturing a colored contact lens comprising providing a transparent contact lens, applying a colorant to the surface of such contact lens and rendering the colorant resistant to removal by ocular fluids, where the contact lens has a central pupil section and an iris section surrounding such pupil section, the improvement comprising applying the colorant in an intermittant pattern, the elements of the pattern being undiscernable to the ordinary viewer, over the entire iris section in a manner such that at least about ten percent of the iris section is covered and such that a sufficient amount of the iris within the interstices of the pattern is left uncovered to permit visualization of the structure of the iris of the lens wearer's eye.

2. The process of claim 1 where the colorant covers at least about 20 percent of the surface of the iris section of the lens.

3. The process of claim 1 where the colorant covers at least about 30 percent of the surface of the iris section of the lens.

4. The process of claim 3 where the colorant covers up to 80 percent of the surface of the iris section of the lens.

5. The process of claim 1 wherein the lens is manufactured from a hydrophilic material.

6. The process of claim 2 wherein the lens is manufactured from a hydrophilic material.

7. The process of claim 3 wherein the lens is manufactured from a hydrophilic material.

8. The process of claim 4 wherein the lens is manufactured from a hydrophilic material.

9. The process of claim 1 wherein the colorant is a translucent colorant.

10. The process of claim 2 wherein the colorant is a translucent colorant.

11. The process of claim 3 wherein the colorant is a translucent colorant.

12. The process of claim 4 wherein the colorant is a translucent colorant.

13. The process of claim 1 wherein the colorant is an opaque colorant.

14. The process of claim 2 wherein the colorant is an opaque colorant.

15. The process of claim 3 wherein the colorant is an opaque colorant.

16. The process of claim 4 wherein the colorant is an opaque colorant.

17. A contact lens suitable for changing the apparent tint of the lens wearer's iris comprising:

(1) a transparent pupil section (2) a transparent iris section surrounding such pupil section (3) a translucent colorant deposited on a surface in an intermittant pattern, the elements of the pattern being undiscernable to the ordinary viewer, over the entire iris section such that at least about thirty percent of the surface of the iris section is covered by the colorant but a sufficient portion of the surface of the iris section is free of colorant thereby permitting visualization of the structure of the iris of the lens wearer's eye.

18. The lens of claim 17 constructed of a hydrophilic material and further comprising a transparent peripheral section surrounding said iris section.

19. The lens of claim 17 wherein the colorant is deposited as translucent dots.

20. The lens of claim 18 wherein the colorant is deposited as translucent dots.

* * * * *